3,470,201
DYESTUFFS FOR BALL-POINT PEN INKS
Norman L. Anderson, Hamburg, and Alvin C. Litke, West Seneca, N.Y., assignors to Allied Chemical Corporation, New York, N.Y., a corporation of New York
No Drawing. Filed July 22, 1965, Ser. No. 474,168
Int. Cl. C09b 47/04
U.S. Cl. 260—314.5     11 Claims

ABSTRACT OF THE DISCLOSURE

Production of phthalocyanine dyestuffs useful as colorants for ball-point pen inks, characterized by imparting to such inks a high degree of stability, particularly, resistance to hydrolysis and water fastness, by reaction of a metal phthalocyanine disulfonic acid and a diphenyl guanidine substituted by a di-lower alkylamine group and, optionally, by a lower alkyl group, in each of the benzene rings of said diphenyl guanidine.

---

This invention relates to new dyestuffs for ball-point pen inks which are characterized by imparting to such inks a high degree of stability, particularly resistance to hydrolysis and water fastness.

Inks for ball-point pens must meet many exacting specifications in order to perform satisfactorily. Thus, they must have high tinctorial value, yet the color should not crystallize out at the high concentrations employed. The solvents used must have very low volatility to prevent evaporation and consequent clogging or freezing of the ball in the socket of the point. The viscosity of ball-point pen inks should be such that the ink will not leak from the pen point nor from the open end of the supply tube when the pen is inverted. Yet the viscosity must not be so high as to prevent free flow of ink at the ball and socket while writing. In addition, ball-point pen inks must be free of solid foreign matter and must be non-corrosive to the metal parts of the pen with which it comes in contact. Finally, for the purpose of permanence, the written record produced by ball-point pen inks should have good light fastness and water fastness.

Dyestuffs generally available for use in ball-point pen ink formulations have in general one or more of the following deficiencies: poor resistance to water bleed, poor storage stability, corrosive action on the ball and socket of the pen. These faults are characteristic of the diaryl guanidine salts of dyestuffs containing sulfonic acid groups, such as the phthalocyanine sulfonic acid compounds described in U.S. 2,153,740 and U.S. 3,010,970. It has now become apparent that these deficiencies are due to a common cause, namely, the tendency of these salts to undergo hydrolysis.

It is therefore an object of the present invention to provide colorants for ball-point pen inks which have greatly increased resistance to hydrolysis and which are substantially free from the above mentioned deficiencies.

It has now been found that the novel colorants within the scope of this invention possess a high degree of resistance to hydrolysis. The preferred colorants of the present invention have the following formula:

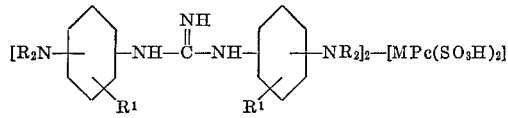

wherein R represents alkyl groups of 1 to 4 carbon atoms and R¹ is selected from the group consisting of hydrogen and alkyl groups of 1 to 6 carbon atoms, and MPc represents a metal phthalocyanine such as copper, cobalt and nickel phthalocyanines. The colorants represented by this formula can be defined as salts containing two moles of a basic guanidine component and one mole of a metal phthalocyanine disulfonic acid. The basic component is a diphenyl guanidine of the structure:

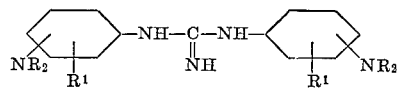

in which R and R¹ have the values defined above.

The colorants of the present invention are soluble in solvents such as benzyl alcohol and alkylene glycols, e.g., propylene glycol, diethylene glycol, 1,3-butanediol, and octylene glycol, but insoluble in water. When used in ball-point pen formulations they produce a turquoise blue shade having excellent water fastness and durability. In addition, such formulations possess outstanding storage stability, and are remarkably free from corrosive action on the ball and socket of the pen.

The ball pen ink dyestuffs of this invention are ordinarily prepared by heating a mixture of an aqueous solution of one or a mixture of the above defined diphenyl guanidines, preferably as the hydrochloride salt, and an aqueous solution of a metal phthalocyanine disulfonic acid salt, of preferably an alkali metal at a temperature ranging from 25° C. to 100° C. The resulting salt of the guanidine component and the phthalocyanine disulfonic acid, being insoluble in water, precipitates from the solution as the desired colored product. It is isolated, dried, and ground.

The following are examples of diphenylguanidines having a lower dialkylamino groups as a substituent on each of the benzene rings and which can be used for the preparation of the dyestuffs of this invention:

1,3-bis(3-dimethylaminophenyl)guanidine
1,3-bis(4-dimethylaminophenyl)guanidine
1,3-bis(4-dimethylamino-2-ethylphenyl)guanidine
1,3-bis(4-dimethylamino-2-isopropylphenyl)guanidine
1,3-bis(2-dimethylamino-4-[1-methylpentyl]phenyl) guanidine
1,3-bis(4-diethylamino-2-methylphenyl)guanidine
1,3-bis(4-diethylamino-2-sec-butylphenyl)guanidine
1,3-bis(4-diethylamino-2-sec-amylphenyl)guanidine
1,3-bis(4-diethylamino-3-methylphenyl)guanidine
1,3-bis(4-diethylamino-3-ethylphenyl)guanidine
1,3-bis(2-diethylamino-4-isopropylphenyl)guanidine
1,3-bis(4-di-n-butylamino-2-methylphenyl)guanidine
1,3-bis(4-di-n-butylamino-3-methylphenyl)guanidine Mixtures of the above or equivalent substituted diphenylguanidines may also be used.

Phthalocyanine disulfonic acids which may be reacted with the above guanidines to prepare the colorants of the present invention include the copper, cobalt and nickel compounds.

The following example illustrates the preparation and use of the colorants of this invention.

Example I.—1,3-bis(4-diethylamino-2-methylphenyl) guanidine copper phthalocyaninedisulfonate The required guanidine component of the above named colorant was prepared as follows: 4-N,N-diethylamino-2-methyl aniline was condensed with carbon disulfide to form 1,3-bis(4-diethylamino - 2 - methylphenyl)thiourea which was then heated with litharge and ammonia to produce the desired guanidine compound. To 18.6 g. (0.049) mole of the above prepared 1,3 - bis(4 - diethylamino-2-methylphenyl)guanidine, suspended in 500 ml. of water, was added sufficient 20° Bé. hydrochloric acid to effect solution (slightly acid to light Congo test paper). A copper phthalocyanine disulfonic acid (sodium salt) solution was prepared as follows: A 60 g. portion of 30% copper phthalocyanine disulfonic acid press cake (18 g. 0.025 mole of 100%) was slurried in 300 ml. of water. The pH was brought to 6-6.5 by the addition of calcium hydroxide and then adjusted to pH 9.8-10.0 with soda ash. To the sodium salt solution thus obtained was added 1.6 g. of Solka Floc (a purified wood cellulose filter aid) and the mixture was sludge-filtered to remove precipitated calcium sulfate. To the filtrate was added 1.6 g. of Nullapon (ethylenediamine tetraacetic acid, a chelating agent).

The above solution of copper phthalocyanine disulfonic acid (sodium salt) was agitated and heated to 60-65° C., then the previously prepared substituted guanidine hydrochloride solution was added. The blue precipitated product was filtered, washed salt-free with water, dried, and then ground in a micropulverizer.

Example II.—Preparation of ink

An ink was prepared from the above colorant according to the following formulation:

Component: Parts by weight
Copper phthalocyanine disulfonic
 acid salt of 1,3-bis(4-diethyl-
 amino-2-methylphenyl) guanidine _____ 40
Propylene glycol _____ 58
Oleic acid _____ 2

The components were mixed using high speed agitation at 70-80° C. until the colorant was completely dissolved. The solution was then centrifuged to remove traces of solid matter.

Suitable formulations of ball-point pen inks can be obtained using 30%-40% concentrations of the dyestuffs of the present invention. Oleic acid (1%-5%) is generally used as a lubricant for the ball and socket.

Example III.—Water-fastness test

For purposes of comparison, the above prepared ink (identified as C) was tested against two inks (designated A and B), prepared in identically the same fashion as C from the copper phthalocyanine disulfonic acid salts of (A) diorthotolylguanidine and (B) di-mixed xylylguanidine. Inks (A) and (B) are those described in U.S. 3,010,970. The test employed, commonly called the quick water-bleed test, is performed as follows: A heavy ink line is made on a strip of bibulous paper using 20 pen strokes (10 forward and 10 backward). The paper is immersed in water, keeping the ink line above the surface of the water, for about 1 to 2 minutes, then removed. As the water continues to be absorbed up the strip by capillary action, it eventually crosses the ink line. If the ink is not water-fast it will "bleed" up the paper strip. When applied to inks A, B and C the above test gave the following results:

Ink: Bleed
A _____ Appreciable.
B _____ Some.
C _____ None.

These results demonstrate the superior water-fastness of ink C, prepared from a colorant of this invention, as compared to inks A and B.

The foregoing examples are illustrative of the invention only and are not intended to limit the scope of the invention. The terms and expressions employed are terms of description and not limitation. It is recognized that various modifications are within the scope of the invention.

We claim:
1. A phthalocyanine dyestuff of the formula

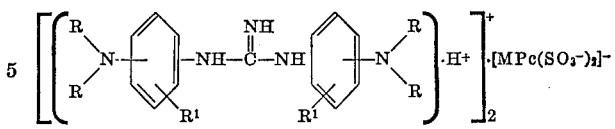

wherein R represents an alkyl group of 1-4 carbon atoms and $R^1$ is a member selected from the group consisting of hydrogen and an alkyl group of 1-6 carbon atoms, said dialkylamino group represented by

and the group represented by R' of said formula being substituted in the 4- and 2-positions, the 4- and 3-positions, or the 2- and 4-positions, respectively, relative to the nitrogen atom attached to the phenyl ring bearing said dialkylamino and R' groups and further with the proviso that when R' is hydrogen, said dialkylamino group may be substituted in the 3-position or 4-position relative to the nitrogen atom attached to the phenyl ring bearing said dialkylamino group and MPc represents a metal phthalocyanine group in which M is a metal being a member selected from the group consisting of copper, cobalt and nickel and Pc is a phthalocyanine radical.

2. A phthalocyanine dyestuff as defined in claim 1 wherein M is copper.

3. A phthalocyanine dyestuff as defined in claim 1 wherein M is cobalt.

4. A phthalocyanine dyestuff as defined in claim 1 wherein M is nickel.

5. A phthalocyanine dyestuff as defined in claim 1 wherein the substituted diphenyl guanidine is 1,3-bis(4-dimethylamino-2-ethylphenyl)guanidine.

6. A phthalocyanine dyestuff as defined in claim 1 wherein the substituted diphenyl guanidine is 1,3-bis(4-dimethylaminophenyl)guanidine.

7. A phthalocyanine dyestuff as defined in claim 1 wherein the substituted diphenyl guanidine is 1,3-bis(4-diethylamino-2-sec-butylphenyl)guanidine.

8. A phthalocyanine dyestuff as defined in claim 1 wherein the substituted diphenyl guanidine is 1,3-bis(4-diethylamino-3-methylphenyl)guanidine.

9. A phthalocyanine dyestuff as defined in claim 1 wherein the substituted diphenyl guanidine is 1,3-bis(2-diethylamino-4-isopropylphenyl)guanidine.

10. A phthalocyanine dyestuff as defined in claim 1 wherein the substituted diphenyl guanidine is 1,3-bis(4-di-n-butylamino-3-methylphenyl)guanidine.

11. 1,3-bis(4 - diethylamino-2-methylphenyl)guanidine copper phthalocyaninedisulfonate.

References Cited

UNITED STATES PATENTS 3,082,213  3/1963  Pugin et al. _____ 260—314.5
3,010,970  11/1961  Fiess _____ 260—314.5
2,153,740  4/1939  Carleton et al. _____ 260—314.5

HENRY R. JILES, Primary Examiner

H. I. MOATZ, Assistant Examiner

U.S. Cl. X.R.
106—23